United States Patent
Audigie et al.

(10) Patent No.: US 9,462,742 B2
(45) Date of Patent: Oct. 11, 2016

(54) DISTRIBUTION MACHINE WITH A DEVICE FOR REMOTELY SUPPLYING AT LEAST ONE AUXILIARY TANK COMPRISING AN AIR EXHAUST DEVICE

(71) Applicant: KUHN S.A., Saverne (FR)

(72) Inventors: Jean-Charles Audigie, Bouxwiller (FR); Julien Eberhart, Veckersviller (FR); Nicolas Supper, Dangolsheim (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 14/441,253

(22) PCT Filed: Dec. 17, 2013

(86) PCT No.: PCT/FR2013/053118
§ 371 (c)(1),
(2) Date: May 7, 2015

(87) PCT Pub. No.: WO2014/096671
PCT Pub. Date: Jun. 26, 2014

(65) Prior Publication Data
US 2015/0296702 A1    Oct. 22, 2015

(30) Foreign Application Priority Data
Dec. 19, 2012   (FR) ..................................... 12 62297

(51) Int. Cl.
*A01C 7/08*   (2006.01)
*A01C 7/20*   (2006.01)

(52) U.S. Cl.
CPC ............... *A01C 7/082* (2013.01); *A01C 7/081* (2013.01); *A01C 7/20* (2013.01)

(58) Field of Classification Search
CPC .......... A01C 7/081; A01C 7/08; A01C 7/00; A01C 7/20; A01C 7/082
See application file for complete search history.

(56) References Cited

U.S. PATENT DOCUMENTS

| | | |
|---|---|---|
| 2003/0177966 A1 | 9/2003 | Lee et al. |
| 2008/0264313 A1 | 10/2008 | Sauder et al. |
| 2010/0313802 A1 | 12/2010 | Sauder et al. |
| 2011/0000409 A1 | 1/2011 | Wilhelmi et al. |
| 2014/0020609 A1 | 1/2014 | Audigie |

FOREIGN PATENT DOCUMENTS

| | | |
|---|---|---|
| FR | 2 973 790 | 10/2012 |
| WO | 2011 002541 | 1/2011 |

OTHER PUBLICATIONS

International Search Report Issued Mar. 18, 2014 in PCT/FR2013/053118 Filed Dec. 17, 2013.

*Primary Examiner* — Christopher J Novosad
(74) *Attorney, Agent, or Firm* — Oblon, McClelland, Maier & Neustadt, L.L.P.

(57) ABSTRACT

A distribution machine including a supply device for a self-regulated pneumatic supply from a main reservoir containing product toward at least one auxiliary reservoir according to its filling rate via a respective tight duct, each auxiliary reservoir including an air exhaust device and a distribution unit for distributing the product including a supply chamber and a rotary regulating element. The air exhaust device is configured to extend substantially below an overflow spot of the supply chamber.

9 Claims, 3 Drawing Sheets

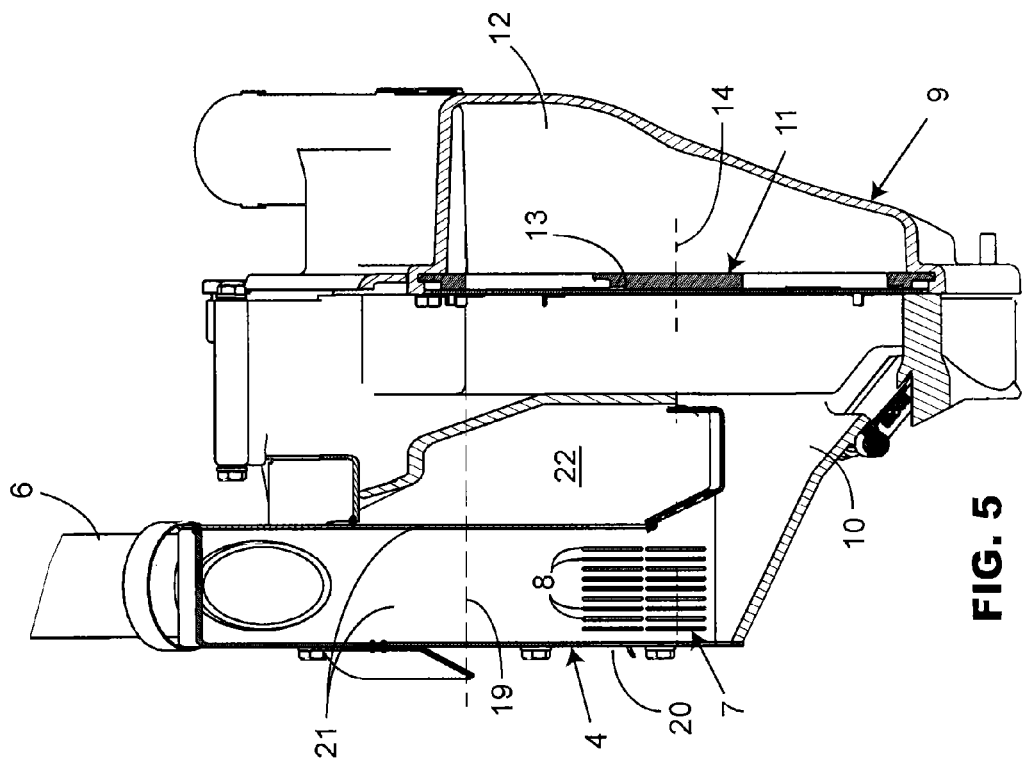
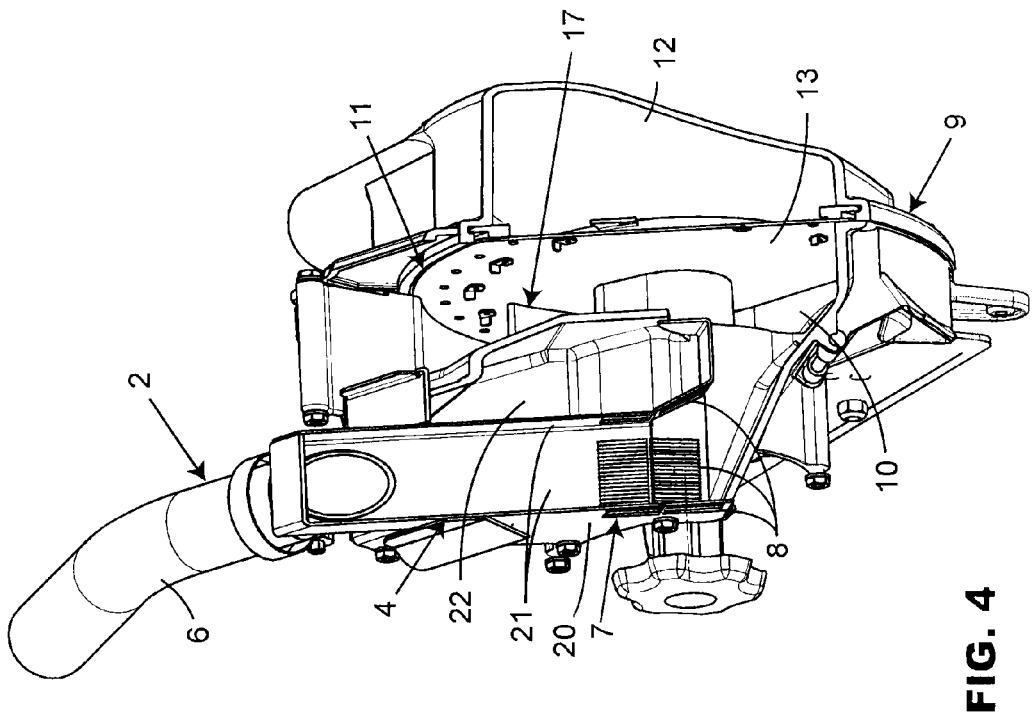

DISTRIBUTION MACHINE WITH A DEVICE FOR REMOTELY SUPPLYING AT LEAST ONE AUXILIARY TANK COMPRISING AN AIR EXHAUST DEVICE

BACKGROUND

The present invention relates to the general technical field of agricultural machinery. The invention relates to a distribution machine with a supply device for a self-regulated pneumatic supply from a main reservoir containing product toward at least one auxiliary reservoir according to its filling rate via a respective tight duct, each auxiliary reservoir comprising an air exhaust device and a distribution unit for distributing the product comprising a supply chamber and a rotary regulating element.

Such a supply device for a seeder is described in application FR 2 315 834. This supply device makes it possible to convey product, such as seeds, from a main reservoir to at least one auxiliary reservoir. The product is conveyed via an air flow through a tight duct according to the filling rate of the auxiliary reservoir. The auxiliary reservoir has an air exhaust device implemented on one of its sidewalls. The air exhaust device creates a loss of charge that decreases according to the filling of the auxiliary reservoir. When the auxiliary reservoir is full, the loss of charge is nil and the conveying of seeds from the main reservoir is stopped. The auxiliary reservoirs are therefore supplied with seeds individually and automatically according to their filling rate. The supply of the auxiliary reservoir via an air leak depends on the type of product that is conveyed, and in particular on its shape and capacity to obstruct the air exhaust device.

Another self-regulated pneumatic supply device for a distribution machine such as a seeder is disclosed by document WO 2011/002541. The seeds are conveyed through a tight duct from the main reservoir to the auxiliary reservoirs. The end of the duct is provided with air exhaust openings and is placed above the distribution unit. When the seeds accumulate substantially above the air exhaust openings, the seed reserve reaches a high level. The supply of seeds is then interrupted, since the air flow no longer manages to pass through the seeds. The seed level decreases as the rotary regulating element delivers the seeds into the soil. When the seeds have reached a low level below the openings, the air flow increases and the conveying of seeds resumes and continues until the high level is once again reached. The openings of the air exhaust device extend above the distribution unit, and as a result the maximum level of the seeds is higher than the seed overflow spot in the distribution unit. The seeds contained in the auxiliary reservoir supply the rotary regulating element and tend to "push" the seeds from the supply chamber so that the seed level is at the same height in the distribution unit. This phenomenon may cause the seed layer to rise up to overflowing and release seeds in addition to those picked up by the rotary regulating element. The seeding quality is therefore altered by releasing a volume of seeds instead of a regular single seed regulation. Furthermore, the beginning of conveying seeds to the auxiliary reservoir, nearly emptied of seeds, often takes place in an uncertain manner due to an insufficient air leak at the auxiliary reservoir. In that case, the rotary regulating element risks rotating without seeds.

BRIEF SUMMARY

The present invention aims to overcome the aforementioned drawbacks. It must in particular propose a distribution machine with a distribution unit supplied remotely with product and the product reserve of which is minimal while ensuring a correct supply of the rotary regulating element.

To that end, one important feature lies in the fact that the air exhaust device is configured to extend substantially below the overflow spot of the supply chamber. Owing to this feature, the risk of overflow of the seed layer is eliminated, since the maximum seed level of the auxiliary reservoir is below the overflow spot of the supply chamber. The rotary regulating element is in all cases supplied correctly to have proper seed distribution.

According to another important feature, the air exhaust device is provided to have openings in at least two substantially vertical walls of the auxiliary reservoir. With an air exhaust surface and therefore a more significant leak, the start procedure to begin conveying seeds is clear and unequivocal.

BRIEF DESCRIPTION OF THE DRAWINGS

Other features and advantages of the invention will emerge from the following description in light of the appended drawings, which are provided solely as non-limiting example embodiments of the invention. In these drawings:

FIG. 4 shows the inner portion of the distribution unit and the auxiliary reservoir, FIG. 5 is a sectional view of FIG. 4.

DETAILED DESCRIPTION

Figure 1:
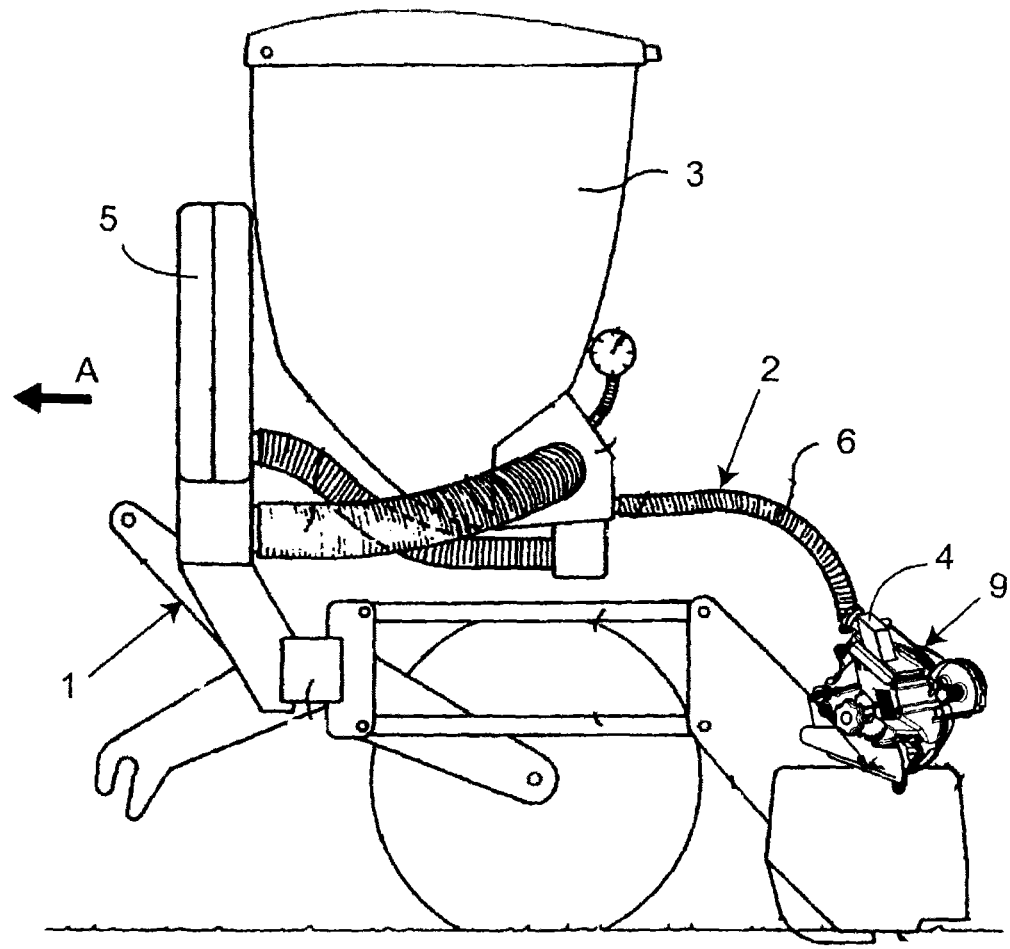
FIG. 1 shows a side view of a distribution machine with a supply device according to the invention.

FIG. 1 is a side view of an agricultural distribution machine (1) with a supply device (2) for a self-regulated pneumatic supply according to the invention. The distribution machine (1) in particular has a main reservoir (3) intended to contain product and at least one auxiliary reservoir (4). Each auxiliary reservoir (4) is supplied remotely via the supply device (2) from the main reservoir (3). The supply and therefore conveying of product are carried out by an air flow generated by a blower (5). The incoming air flow rate of the blower (5) and the outgoing flow rate are adjustable. The supply is carried out in an individual manner and according to the filling rate of the auxiliary reservoir (4) via a respective tight duct (6). Each auxiliary reservoir (4) comprises an air exhaust device (7) to evacuate the air flow used for product conveying. The air exhaust device (7) is a leak. It is made in the form of openings (8) arranged in the auxiliary reservoir (4). The size of these openings (8) is such that the product to be conveyed cannot escape through the openings (8).

The blower (5) provides an air flow in the form of compressed air that removes the product from the main reservoir (3) to convey it to the auxiliary reservoirs (4) by the respective tight duct (6). The accumulation of product in the auxiliary reservoir (4) causes a loss of charge that slows down the air flow in the tight duct (6) enough to prevent the conveying of the product. The supply of the auxiliary reservoir (4) is thus interrupted, when it is full. When the auxiliary reservoir (4) has emptied, the product is no longer accumulated in front of the air exhaust device (7). The loss of charge decreases and product conveying resumes. The supply device (2) therefore allows a self-regulated supply according to the filling rate of the auxiliary reservoir (4).

Figure 3:
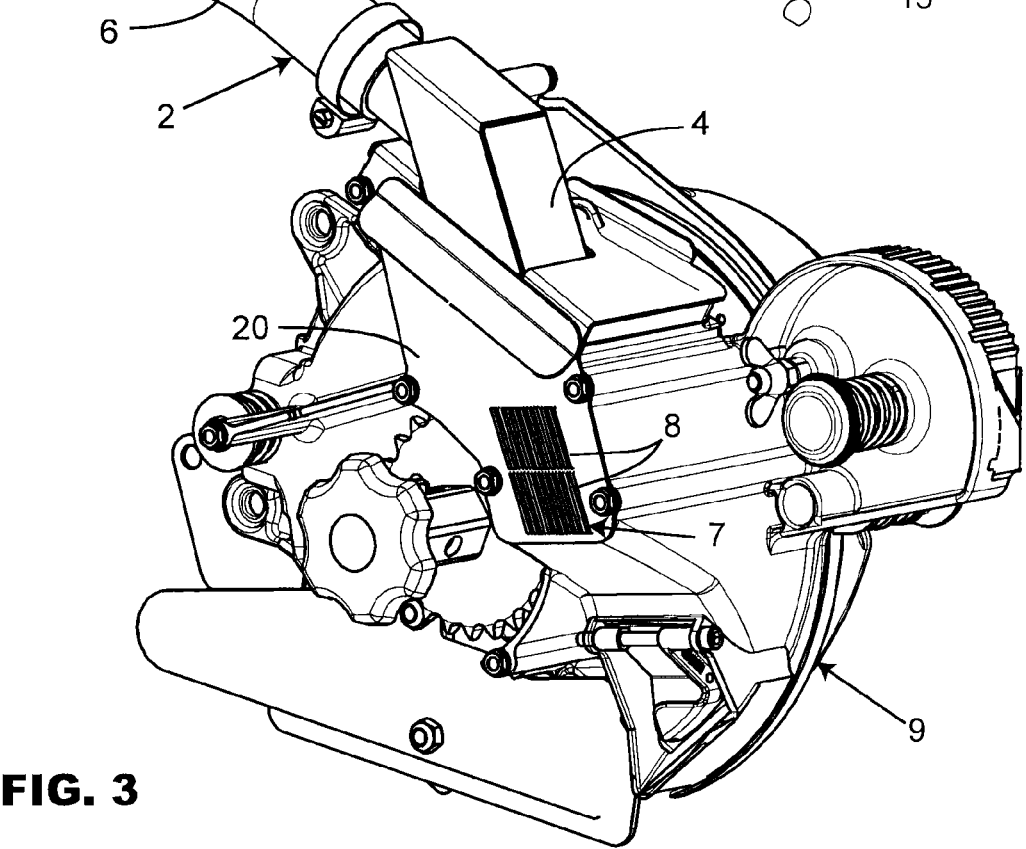
FIG. 3 is a perspective view of a distribution unit with an auxiliary reservoir.

FIG. 3 shows a distribution unit (9) with which an auxiliary reservoir (4) is associated. The distribution unit (9) comprises a supply chamber (10) containing product and a rotary regulating element (11). The supply chamber (10) is supplied with product via the auxiliary reservoir (4). FIG. 4 shows a sectional view of the inside of the distribution unit (9) and the auxiliary reservoir (4). It is thus possible to see the air exhaust device (7) inside the auxiliary reservoir (4). FIG. 5 is a sectional view of the distribution unit (9) with the auxiliary reservoir (4). The figures show a distribution unit (9), with a vertical disc, according to the invention. This distribution unit (9) serves to remove the seeds one at a time and distribute them at regular intervals in the seeding row. Such distribution units (9) are found on single seeders. Each seeding element has its own distribution unit (9) with a drilled disc (13). The seed selection is assisted by an air flow by negative pressure. The seed selection may also be carried out in an alternative manner using a pressurized air flow with a drilled or honeycomb structured disc. The distribution unit may also be completely mechanical without requiring an air flow to select the seeds.

In the example shown in the figures, the distribution unit (9) is a negative pressure distribution that makes it possible to remove seeds from the auxiliary reservoir (4) one at a time and distribute them at regular intervals in the row. The distribution unit (9) thus comprises the supply chamber (10), an exhausting chamber (12) and a drilled disc (13) separating the two chambers (10, 12). In this example, the rotary regulating element (11) is the drilled disc (13). The drilled disc (13) is intended to rotate around a substantially horizontal rotation axis (14). The seeds are picked up from the bottom of the distribution unit (9) and released at the drive out opening (15) to next reach the furrow. During operation, the drilled disc (13) plunges in the bottom of the distribution unit (9) and rotates to carry the seeds. At least one seed is suctioned by the negative pressure, which presses it on each hole of the drilled disc (13). The seeds are held for at least part of their angular movement. During rotation, the seeds pass in front of a selector (16), which leaves only one per hole. An ejector facilitates the removal of the seeds to release the seed, which falls into the furrow at the drive out opening (15). Such vertical disc distribution distributes the seeds at regular intervals throughout the row.

Figure 2:
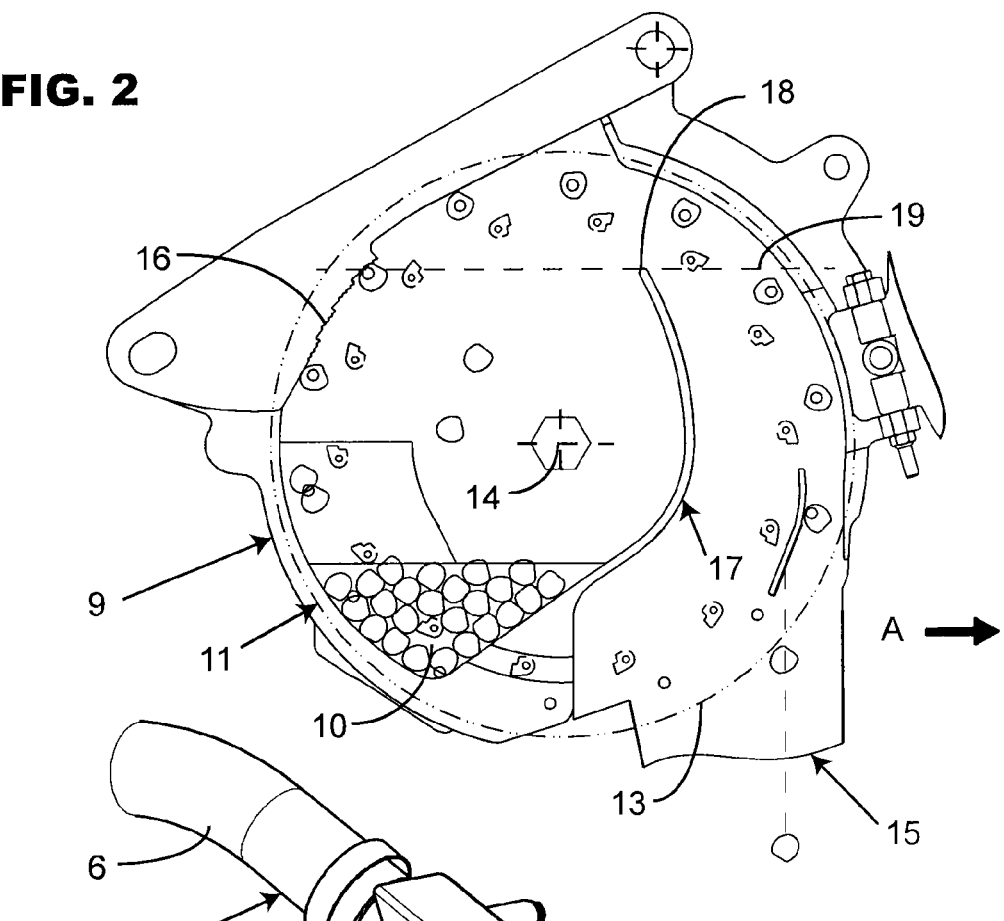
FIG. 2 illustrates the operation of a distribution unit.

Advantageously and according to the example shown in FIG. 2, a substantially vertical division (17) is provided in the supply chamber (10) to recover the additional seeds eliminated by the selector (16) during the rotation of the drilled disc (13). The division (17) is placed, taking account of the rotation of the disc, after the selector (16). This division (17) makes it possible to separate the selection portion and the seed drive out portion of the supply chamber (10). The division (17) also serves to retain the seeds during seeding on a fairly steep downward slope. It serves to keep the seeds in the selection portion when the seed level increases temporarily. The distribution of seeds is precise and regular as long as the seeds in the bottom of the distribution unit (9) do not go beyond the division (17). According to a general manner, the overflow spot (18) of the distribution unit (9) is the boundary past which the distribution does no longer take place precisely. In the example of FIG. 2, the overflow spot (18) corresponds to the apex of the division (17) that extends in the upper portion of the distribution unit (9). Several seeds are shown in the bottom of the distribution unit (9) in FIG. 2. This is the ideal level for the seed layer making it possible to ensure a correct supply of the drilled disc (13). When the seed level exceeds the horizontal plane (19), and therefore the overflow spot (18), the distribution unit (9) releases additional seeds to those picked up by the drilled disc (13). The quality of the seeding is therefore altered, since the single-seed distribution machine is no longer able to remove the seeds one at a time. In order to resolve this problem, the seed level of the distribution unit (9) extends at a much lower level relative to the overflow spot (18) and in a substantially horizontal plane (19) passing through the overflow spot (18). For the seeds eliminated by the selector (16) to be oriented toward the bottom of the distribution unit (9), the overflow spot (18) extends over the selector (16). The division (17) extends in front of the rotation axis (14) of the drilled disc (13). Preferably, the overflow spot (18) extends above at least part of the selector (16).

According to one important feature of the invention, the air exhaust device (7) is configured to extend substantially below the overflow spot (18) of the supply chamber (10). The air blown into the auxiliary reservoir (4) for seed conveying must not remain in the supply chamber (10) of the distribution unit (9) for proper operation, which is why it is provided that it escapes through the openings (8) of the air exhaust device (7). The air exhaust device (7) is situated below a horizontal plane (19) passing through the overflow spot (18). In this way, the overflow risk of the seed level in the selection portion is eliminated because the maximum seed level of the auxiliary reservoir (4) is below the overflow spot (18) of the supply chamber (10). Even if, during operation, the seeds of the auxiliary reservoir (4) tend to push the seeds of the supply chamber (10), the seed level does not exceed the overflow spot and the distribution precision will be that of the rotary regulating element (11).

According to one advantageous feature, at least part of the air exhaust device (7) is integrated into the distribution unit (9). The full integration of the air exhaust device (7) into the distribution unit (9) makes it possible to develop a compact solution. The air exhaust device (7) advantageously extends in the bottom of the auxiliary reservoir (4). The high and low seed levels in the auxiliary reservoir (4) are established by the air exhaust device (7), and in particular by the position of the air leak openings (8) of the air exhaust device (7). The configuration of the auxiliary reservoir (4) and the air exhaust device (7) are such that the low seed level corresponds to a reduced seed reserve that is sufficient to supply the rotary regulating element (11) with no misses.

According to FIG. 4, the air exhaust device (7) is made in the form of openings (8) arranged in at least two substantially vertical walls of the auxiliary reservoir (4). With openings (8) on more than one wall, the exhaust setting, and therefore the air leak of the auxiliary reservoir (4), is greater. The dimensions of the openings (8) are smaller than those of the product to be distributed. The openings (8) are arranged in the auxiliary reservoir (4), and in particular in an outer wall (20) of the auxiliary reservoir (4) and in at least one inner wall (21). The outer wall (20) extends outside the distribution unit (9), while an inner wall (21) extends inside the distribution unit (9). The configuration of the auxiliary reservoir (4) is generally such that the outer wall (20) is a wall having a large surface making it possible to arrange a large number of openings (8) therein. By placing additional openings (8) on an inner wall (21) of the auxiliary reservoir (4), the air exhaust surface increases and the start procedure to begin seed conveying is clearer. Advantageously, the inner wall (21) provided with openings (8) is that which extends opposite the outer wall (20). In this way, the air exhaust surface is doubled.

In the illustrated example embodiment, the shape of the auxiliary reservoir (4) is parallelepipedic, the walls are substantially planar and vertical. The auxiliary reservoir (4) comprises an outer wall (20) and three inner walls (21). The openings (8) are arranged over the entire periphery of the auxiliary reservoir (4), each of the walls is thus provided with openings (8). The air exhaust device (7) then has a very large air leak surface, which allows optimal starting of seed conveying to the auxiliary reservoir (4). All of the openings (8) extend below the horizontal plane (19). Some openings (8) are also arranged in inclined walls. Furthermore, a majority of openings (8) extend above a horizontal plane passing through the rotation axis of the rotary regulating element (11), and in particular above a horizontal plane passing through the rotation axis (14) of the drilled disc (13).

Advantageously, an exhaust chamber (22) extends at least partially around the auxiliary reservoir (4). The exhaust chamber (22) for example allows the openings (8) of the inner wall (21) to discharge the blown air when it involves the inner wall (21) that extends opposite the outer wall (20). The exhaust chamber (22) extends between the auxiliary reservoir (4) and the rotary regulating element (11). The exhaust chamber (22) allows the air blown into the tight ducts (6) also to be discharged through the openings arranged in the inner walls (21) of the auxiliary reservoir (4). The exhaust chamber (22) advantageously extends around the auxiliary reservoir (4) such that the three inner walls (21) discharge the blown air. Owing to the exhaust chamber (22), all of the openings (8) of the auxiliary reservoir (4) receive air.

In an alternative that is not shown, the rotary regulating element is a volumetric metering unit with grooves or lugs. Such a metering unit is suitable for seeding cereals (wheat, barley) or for fertilizer. Such a distribution device also has an overflow spot past which the volumetric distribution unit is no longer able to remove a determined quantity of seeds from the reservoir, since it will also release additional seeds.

The invention is of course not limited to the embodiments described above and shown in the appended drawings. Modifications remain possible, in particular regarding the composition or number of the various elements or by substituting technical equivalents, without, however, going beyond the scope of protection as defined by the following claims.

The invention claimed is:

1. A distribution machine comprising:
   a supply device for a self-regulated pneumatic supply from a main reservoir containing product toward at least one auxiliary reservoir according to a filling rate of the at least one auxiliary reservoir via a respective duct;
   each auxiliary reservoir comprising an air exhaust device and a distribution unit for distributing the product comprising a supply chamber and a rotary regulating element;
   wherein the air exhaust device is configured to extend substantially below an overflow spot of the supply chamber, the overflow spot being a level above which the product exits the distribution unit,
   wherein the air exhaust device includes openings and all of the openings of the air exhaust device are below a horizontal plane passing through the overflow spot.

2. The distribution machine according to claim 1, wherein the air exhaust device is integrated into the distribution unit.

3. The distribution machine according to claim 1, wherein the openings of the air exhaust device are arranged in at least two substantially vertical walls of the at least one auxiliary reservoir, dimensions of the openings being smaller than those of the product to be distributed.

4. The distribution machine according to claim 1, wherein the openings are arranged in an outer wall and at least one inner wall of the at least one auxiliary reservoir.

5. The distribution machine according to claim 4, wherein the at least one inner wall extends opposite the outer wall.

6. The distribution machine according to claim 1, wherein an exhaust chamber extends at least partially around the at least one auxiliary reservoir.

7. The distribution machine according to claim 6, wherein the exhaust chamber extends between the at least one auxiliary reservoir and the rotary regulating element.

8. The distribution machine according to claim 1, wherein the distribution machine is a seeder.

9. The distribution machine according to claim 1, wherein the distribution unit includes a division in the supply chamber and the overflow spot is located at an apex of the division.

* * * * *